United States Patent
Wydra

(10) Patent No.: US 6,662,747 B1
(45) Date of Patent: Dec. 16, 2003

(54) ANIMAL FEEDER

(76) Inventor: Andrew P. Wydra, 4307 Country Club Dr., Orlando, FL (US) 32808

(*) Notice: Subject to any disclaimer, the term of this patent is extended or adjusted under 35 U.S.C. 154(b) by 0 days.

(21) Appl. No.: 10/337,793

(22) Filed: Jan. 8, 2003

(51) Int. Cl.[7] .................................................. A01K 7/00
(52) U.S. Cl. ........................ 119/63; 119/57.9; 119/59; 119/51.5
(58) Field of Search .................... 119/63, 57.9, 61, 119/51.5, 62, 57.8, 59, 72, 74; 30/133

(56) References Cited

U.S. PATENT DOCUMENTS

| | | |
|---|---|---|
| 1,084,647 A | 1/1914 | Libison |
| 1,769,408 A | 7/1930 | Andrews |
| 2,987,041 A | 6/1961 | Bard |
| 3,979,854 A * | 9/1976 | Perkins .................... 43/121 |
| 4,030,451 A | 6/1977 | Miller |
| 4,441,458 A * | 4/1984 | Mercil ..................... 119/57.9 |
| 4,546,730 A | 10/1985 | Holland |
| 4,953,506 A * | 9/1990 | Sanders .................... 119/61 |
| 4,966,099 A * | 10/1990 | Arney ...................... 119/61 |
| 5,042,192 A * | 8/1991 | Osteen ..................... 43/109 |
| 5,062,390 A * | 11/1991 | Bescherer et al. .......... 119/72 |
| 5,148,626 A * | 9/1992 | Haake, Sr. ................. 43/121 |
| 5,165,365 A * | 11/1992 | Thompson .................. 119/61 |
| 5,253,609 A * | 10/1993 | Partelow et al. ........... 119/61 |
| 5,461,822 A | 10/1995 | Green et al. |
| 5,850,797 A | 12/1998 | Hunicke |
| 5,881,671 A * | 3/1999 | Riedl ....................... 119/61 |
| 6,058,661 A * | 5/2000 | Hand et al. ................. 52/101 |
| 6,082,301 A * | 7/2000 | Kramer ..................... 119/61 |
| 6,125,790 A | 10/2000 | Breedwell |
| 6,145,477 A * | 11/2000 | Jansen ...................... 119/416 |
| 6,216,383 B1 * | 4/2001 | Klabunde et al. ........... 43/121 |
| 6,463,878 B1 * | 10/2002 | Moody ...................... 119/57.9 |
| 6,478,277 B2 * | 11/2002 | Winquest ................... 248/346.01 |
| 2002/0121246 A1 * | 9/2002 | Harman ..................... 119/61 |
| 2003/0070348 A1 * | 4/2003 | Spragins ................... 43/121 |

OTHER PUBLICATIONS

2001/0042338 U.S. patent application, Oct. 2001, Robert L. Jackson.

* cited by examiner

Primary Examiner—Yvonne Abbott
(74) Attorney, Agent, or Firm—Stephen R. Greiner

(57) ABSTRACT

An animal feeder that protects food contained therein from ants and other crawling insects. The feeder includes a support having a post extending upwardly from a base. A food bowl is suspended from the post above the base. An insect trap is secured to the post between the base and the food bowl. The insect trap has a top wall that is affixed to, and sealed about, the post. A side wall extends downwardly from the periphery of the top wall. A bottom wall is secured to the base of the side wall. The bottom wall has a central opening that encircles the post at a distance and that provides a passageway through which insects may enter the trap. A liquid-retaining wall extends upwardly from the periphery of the opening so as to serve as a dam for a liquid, insect attractant placed in the bottom of the trap.

3 Claims, 1 Drawing Sheet

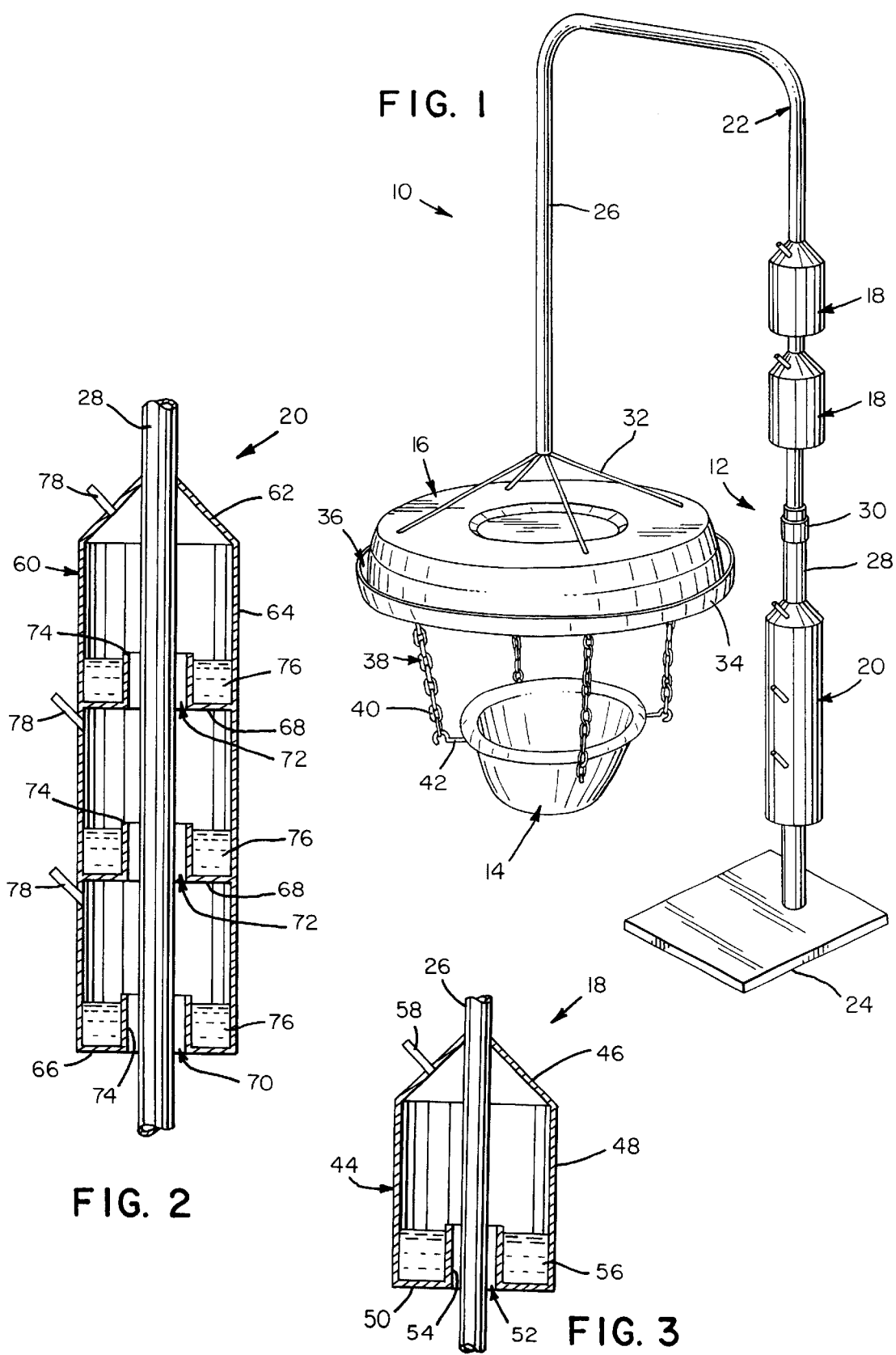

ANIMAL FEEDER

FIELD OF THE INVENTION

The present invention relates generally to animal husbandry and, more particularly, to animal feeding devices.

BACKGROUND OF THE INVENTION

Feeding dogs has never been easy. Food bowls placed directly on the ground are often kicked and knocked over by passersby, making a mess. If that were not enough, spilled food lures ants and other insects to the area. Once in the vicinity, it is not long before the insects invade the bowl and render its contents unfit for a dog to eat.

Some have proposed bowls with water-filled moats as a way to prevent climbing insects from reaching food set out for a dog. Others have proposed that bowls be placed on stands to elevate them from the ground. Neither of these proposals has gained much consumer acceptance or commercial success since insects still seem to gain access to a dog's food.

SUMMARY OF THE INVENTION

In light of the problems associated with the known apparatus for feeding dogs and other animals, it is a principal object of the invention to provide a feeder that allows an animal easy access to food in a bowl yet prevents access to all sorts of climbing insects. Insects attempting to gain access to the bowl are trapped and killed in a manner that is safe to animals feeding at the feeder.

It is another object of the invention to provide an animal feeder of the type described that may be adjusted so that animals of different sizes comfortably can use it.

It is still another object of the invention to provide an animal feeder that prevents precipitation from falling upon the food positioned in it.

It is an object of the invention to provide improved elements and arrangements thereof in an animal feeder for the purposes described which is lightweight in construction, inexpensive to manufacture, and dependable in use.

Briefly, the animal feeder in accordance with this invention achieves the intended objects by featuring a food bowl suspended at the end of a gooseneck post. The bowl is shielded from the weather by a parasol-like cover. A number of insect traps are positioned along the length of the post. Two of the traps comprise closed containers having funnel-like passages in their bottoms into which insects can enter but not exit. A liquid insect attractant is placed in the bottoms of the containers to drown the insects that enter. Another of the traps has a plurality of vertically stacked funnel-like passages within it, each being accompanied by a liquid reservoir to drown insects.

The foregoing and other objects, features and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which:

FIG. 1 is a perspective view of an animal feeder in accordance with the present invention.

FIG. 2 is a longitudinal, cross-sectional view of a first, insect trap forming part of the animal feeder.

FIG. 3 is a longitudinal, cross-sectional view of a second, insect trap forming part of the animal feeder.

Similar reference characters denote corresponding features consistently throughout the accompanying drawings.

DETAILED DESCRIPTION OF THE PREFERRED EMBODIMENT

Referring now to the FIGS., an animal feeder in accordance with the present invention is shown at 10. Feeder 10 includes a support 12 from which is suspended a food bowl 14. Bowl 14 is shielded from the weather by an umbrella-like cover 16. A number of insect traps 18 and 20 are positioned along the length of support 12. Together, traps 18 and 20 prevent all insects from climbing support 12 to gain access to bowl 14.

Support 12 includes a gooseneck post 22 extending upwardly from a base plate 24. Post 22 has an hooked, upper portion 26 that telescopes in and out of a linear, lower portion 28 that is affixed to base plate 24. A locking mechanism 30 of conventional construction joins portions 26 and 28 together and permits the height of post 22 to be selectively varied.

Cover 16 is suspended from the free end of upper portion 26 by a plurality of flexible lanyards 32. As shown, the lanyards 32 extend from upper portion 26 to the periphery of cover 16 so as to provide the cover 16 with a connection that is stable in normal conditions of use. The periphery of cover 16 is provided with an upturned rim 34 that defines a shallow, circular trough 36 around cover 16 for collecting small amounts of precipitation.

A number of chains 38 are secured to the periphery of cover 16 and hang downwardly therefrom. Each of the chains 38 includes a series of joined links or rings 40 into which can be inserted one of a number of retaining hooks 42 projecting from the top of bowl 14. The length of the chains 38 is sufficient to permit an animal to comfortably position his head between the bottom of cover 16 and the top of bowl 14.

Bowl 14 comprises a hollow, rounded, cup-shaped container that is open at its top. Preferably, bowl 14 is closed at its bottom to hold food that may be of a solid or liquid form. The diameter of bowl 14 is less than that of cover 16 so that precipitation falling on cover 16 cannot fall into bowl 14. Furthermore, as retaining hooks 42 extend radially outward from the top of bowl 14, rainwater that may run over cover 16 and perhaps down chains 38 cannot run into the open top of bowl 14 to spoil any food carried thereby.

Traps 18 encircle post 22. As shown, each of the traps 18 includes a container 44 having a conical, top wall 46, the apex of which is affixed to, and sealed about, the upper portion 26 of post 22. A side wall 48 extends downwardly from the periphery of top wall 46. A bottom wall 50 is secured to the base of side wall 48. Bottom wall 50 has a central opening 52 that encircles upper portion 26 at a distance and provides a passageway through which insects may enter container 44. A liquid-retaining wall 54 extends upwardly from the periphery of opening 52 and serves as a dam for a liquid, insect attractant 56 placed in the bottom of container 44 via a spout 58 in top wall 46 to drown the insects.

Trap 20 is similar to trap 18 and, also, encircles post 22. Preferably, trap 20 has an elongated container 60 with a conical, top wall 62, the apex of which is affixed to, and sealed about, the lower portion 28 of post 22. A side wall 64 extends downwardly from the periphery of top wall 62. A bottom wall 66 is secured to the base of side wall 64. A pair of intermediate walls 68 are secured to side wall 64 at spaced intervals between top and bottom walls 62 and 66. Bottom and intermediate walls 66 and 68 have central openings 70 and 72 that encircle lower portion 28 at a distance therefrom and provide a passageways through which insects may enter container 60 and move upwardly toward top wall 62. Liquid-retaining walls 74 extend upwardly from the periphery of openings 70 and 72 which serve as dams for pools of a liquid, insect attractant 76 captured atop walls 66 and 68. Attractant 76 is admitted into container 60 through a number of spouts 78, each penetrating the container 60 above one of the walls 74.

From the foregoing, it should be appreciated that the use of feeder 10 is straightforward. First, support 12 is positioned in a convenient feeding location on a: lawn, patio, kitchen floor or like spot. Then, bowl 14 is suspended above the ground from chains 38 at a distance from cover 16 sufficient for the animal being fed to easily place his mouth within bowl 14. Next, portions 26 and 28 are telescopically adjusted to position food bowl 14 at a height within easy reach of the animal being fed. A suitable food is then placed in bowl 14 beneath cover 16 so as to be shielded from any precipitation.

If this is the first use of feeder 10, traps 18 and 20 will need to be filled with quantities of liquid 56 and 76. Liquid 56 and 76 is poured into spouts 58 and 78. When some liquid flows from openings 52 and 70 in the bottoms of traps 18 and 20 after pouring liquid into each spout 58 and 78, traps 18 and 20 are filled. Thus, there is no need to see inside traps 18 and 20 to learn if they are sufficiently filled. After the initial setup, it may be necessary to periodically provide additional liquid to traps 18 and 20 to compensate for evaporation, but in most cases the additional amounts of liquid required will be small.

After an animal has finished eating from bowl 14, bowl 14 may be detached from chains 38 and washed in a conventional manner. Any insects captured and drowned within traps 18 and 20 would normally be washed out in a sink or with a hose every few weeks. Obviously, most, if not all, of the insects attempting to gain access to bowl 14 would be captured within lowermost trap 20. Insects somehow able to climb around the barrier posed by trap 20 and the several insect-trapping terraces within it would be caught by the lowermost trap 18. The uppermost trap 18 is provided as a stopgap measure in the event that the other two traps 18 and 20 somehow lack liquid 56 or 76. With the preferred configuration of traps 18 and 20, it is not believed that it would be possible for a climbing insect to gain access to bowl. Food in bowl 14, thus, remains clean and untouched by insects during use.

While the invention has been described with a high degree of particularity, it will be appreciated by those skilled in the art that modifications may be made thereto. For example, each of the spouts 58 and 78 may be provided with a cap (a feature not shown in the FIGS. for the sake of-drawing simplicity) during use of animal feeder 10 to prevent the escape of insects from traps 18 and 20 during use of animal feeder 10. Furthermore, any number of traps 18 and 20 could be provided to feeder 10. Therefore, it is to be understood that the present invention is not limited to the sole embodiment described above, but encompasses any and all embodiments within the scope of the following claims.

I claim:

1. An animal feeder, comprising:

a support having a post extending upwardly from a base;

a food bowl suspended from said post above said base; and, an insect trap secured to said post between said base and said food bowl, said insect trap including:
  a conical, top wall, the apex of which is affixed to, and sealed about, said post;
  a side wall extending downwardly from the periphery of said top wall;
  a bottom wall being secured to the base of said side wall, said bottom wall having a central opening that encircles said post at a distance and that provides a passageway through which insects may enter said trap; and,
  a liquid-retaining wall extending upwardly from the periphery of said opening so as to serve as a dam for a liquid, insect attractant placed in the bottom of said trap.

2. An animal feeder, comprising:

an upright post;

a food bowl suspended from said post;

a cover positioned at a fixed distance above said food bowl for shielding said food bowl from precipitation; and, an insect trap secured to said post, said insect trap including:
  a top wall being affixed to, and sealed about, said post;
  a side wall extending downwardly from the periphery of said top wall;
  a bottom wall being secured to the base of said side wall, said bottom wall having a central opening encircling said post at a distance and providing a passageway through which insects may enter said trap; and,
  a liquid-retaining wall extending upwardly from the periphery of said opening so as to serve as a dam for a liquid, insect attractant placed in the bottom of said trap.

3. An animal feeder, comprising:

a post;

a food bowl suspended from said post;

a cover positioned above said food bowl; and, a plurality of insect traps secured to said post at a distance from one another, each said insect trap including:
  a top wall being affixed to, and sealed about, said post;
  a side wall extending downwardly from the periphery of said top wall;
  a bottom wall being secured to the base of said side wall, said bottom wall having a central opening encircling said post at a distance and providing a passageway through which insects may enter said trap; and,
  a liquid-retaining wall extending upwardly from the periphery of said opening so as to serve as a dam for a liquid, insect attractant placed in the bottom of said trap.

* * * * *